United States Patent Office 3,382,208
Patented May 7, 1968

3,382,208
SOLID ORGANIC SUBSTRATES STABILIZED WITH BORATES OF ALKANOL AMINES
Henryk A. Cyba, Evanston, Ill., assignor to Universal Oil Products Company, Des Plaines, Ill., a corporation of Delaware
No Drawing. Filed May 15, 1964, Ser. No. 367,854
12 Claims. (Cl. 260—45.9)

ABSTRACT OF THE DISCLOSURE

A solid polymeric organic substrate, such as a solid polyolefin, normally subject to deterioration by weathering containing, as a stabilizer against such weathering, a borate of N,N-di-sec-alkyl-alkanolamine or of N,N-di-cycloalkyl-alkanolamine. A specific example of this stabilizer is a borate of N,N-di-sec-octyl-ethanolamine.

---

This invention relates to a novel method of improving the weathering properties of solid organic substrates which undergo deterioration upon exposure to ultraviolet light.

The present invention is particularly applicable for use in thermoplastic polymers which normally undergo deterioration upon exposure to sunlight. This deterioration is characterized in its early stages by the breaking of the polymer chain and the formation of carbonyl groups. As the deterioration continues, the plastic cracks and loses tensile strength to the point of mechanical failure. For example, electrical insulation prepared from plastic will undergo embrittlement, increase of power factor and loss of electrical resistance when used in exposed locations. In addition to the mechanical failure, many plastics upon exposure to ultraviolet light undergo discoloration.

In one embodiment the present invention relates to a method of improving the weathering properties of a solid organic substrate which comprises incorporating therein a borate of an alkanolamine selected from the group consisting of N,N - di - sec - alkyl - alkanolamine and N,N-di-cycloalkylalkanolamine.

In a specific embodiment the present invention relates to a method of improving the weathering properties of a solid polyolefin which comprises incorporating therein a borate of N,N-di-sec-octyl-ethanolamine.

In a specific embodiment the present invention relates to a method of improving the weathering properties of a solid polyolefin which comprises incorporating therein a borate of N,N-dicyclohexyl-ethanolamine.

As hereinbefore set forth, the novel weathering additive of the present invention is a borate of a particularly substituted alkanolamine. In one embodiment the particularly substituted alkanolamine is an N,N - di-sec-alkyl-alkanolamine. In a particularly preferred embodiment, each sec-alkyl group contains from 3 to about 20 carbon atoms although, when desired, each alkyl group may contain up to about 40 carbon atoms. Illustrative preferred alkanolamines in this embodiment include N,N - di - isopropyl - ethanolamine, N,N - di-sec - butyl - ethanolamine, N,N - di - sec - pentyl - ethanolamine, N,N - di - sec - hexyl - ethanolamine, N,N-di - sec - heptyl - ethanolamine, N,N - di - sec - octyl-ethanolamine, N,N - di - sec - nonyl - ethanolamine, N,N - di - sec - decyl - ethanolamine, N,N - di - sec - undecyl - ethanolamine, N,N - di - sec - docecyl - ethanolamine, N,N - di - sec - tridecyl - ethanolamine, N,N-di - sec - tetradecyl - ethanolamine, N,N - di - sec - pentadecyl - ethanolamine, N,N - di - sec - hexadecyl - ethanolamine, N,N - di - sec - heptadecyl - ethanolamine, N,N - di - sec - octadecyl - ethanolamine, N,N - di - sec-nonadecyl - ethanolamine, N,N - di - sec - eicosyletha-nolamine, etc., and corresponding compounds in which the ethanolamine moiety is replaced by propanolamine or butanolamine and, when desired, by pentanolamine, hexanolamine, heptanolamine, octanolamine, etc.

In general, it is preferred that the alkyl groups are the same. However, when desired, the alkyl groups may be different but both of them should be of a secondary configuration. Illustrative compounds in this modification include N - isopropyl - N - sec - butyl - ethanolamine, N - isopropyl - N - sec - pentyl - ethanolamine, N - isopropyl - N - sec - hexyl - ethanolamine, N - isopropyl-N - sec - heptyl - ethanolamine, N - isopropyl - N - sec-octyl - ethanolamine, N - sec - butyl - N - sec - pentyl-ethanolamine, N - sec - butyl - N - sec - hexyl - ethanolamine, N - sec - butyl - N - sec - heptyl - ethanolamine, N - sec - pentyl - N - sec - hexyl - ethanolamine, N - sec-pentyl - N - sec - heptyl - ethanolamine, N - sec - hexyl-N - sec - heptyl - ethanolamine, N - sec - hexyl - N - sec-octyl-ethanolamine, etc. Here again, it is understood that the ethanolamine moiety may be replaced by an alkanolamine group containing up to 8 carbon atoms and preferably up to 4 carbon atoms. Although it is preferred that the substituents are alkyl groups, it is understood that the substituents may be alkenyl groups, but not necessarily with equivalent results.

In another embodiment the particularly substituted alkanolamine is N,N - dicycloalkyl - alkanolamine. A preferred alkanolamine in this embodiment is N,N-dicyclohexyl-ethanolamine. Other compounds include N,N-dicyclobutyl - ethanolamine, N,N - dicyclopentyl - ethanolamine, N,N - dicycloheptyl - ethanolamine, N,N-dicyclooctyl - ethanolamine, N,N - dicyclononyl - ethanolamine, N,N - dicyclodecyl - ethanolamine, N,N-dicycloundecyl - ethanolamine, N,N - dicyclododecyl-ethanolamine, etc., and similarly substituted compounds in which the ethanolamine moiety is replaced by an alkanolamine group containing from 3 to about 8 carbon atoms.

The N,N-di-sec-alkyl-alkanolamine and N,N-di-cyclo-alkyl-alkanolamine for use in the present invention may be obtained from any suitable source. Some of these particularly substituted alkanolamines are available in the open market or they may be prepared in any suitable manner. In one method, the alkanolamine is subjected to reductive alkylation with an alkyl ketone or a cyclo-alkyl ketone. For example, N,N-di-octyl-ethanolamine is prepared by the reductive alkylation of ethanolamine with methyl heptyl ketone, ethyl pentyl ketone or propyl butyl ketone. Similarly, N,N-dicyclohexyl-ethanolamine is prepared by the reductive alkylation of ethanolamine with cyclohexanone. It is understood that the ketone will be selected with regard to the particular N,N-di-substituted-ethanolamine desired. The reductive alkylation is effected in the presence of hydrogen and a suitable reductive alkylation catalyst. Any suitable reductive alkylation catalyst is employed including those containing nickel, platinum, palladium, etc., preferably composited with a suitable support. A particularly preferred catalyst comprises a composite of from about 0.1 to about 2% by weight of platinum with alumina, which may or may not contain from about 0.01% to about 1% by weight of fluorine and/or chlorine. Another suitable catalyst comprises an intimate mixture of copper oxide, chromium oxide and barium oxide. When using the platinum catalyst, the temperature generally will be within the range of from about 200° to about 500° F. and a hydrogen pressure of from about 100 to about 3000 p.s.i. or more.

While the N,N-di-sec-alkyl-alkanolamine and N,N-di-cycloalkyl-alkanolamine may be prepared by the reductive alkylation of the corresponding alkanolamine as hereinbefore set forth, in another and preferred method, the corresponding N,N-di-sec-alkylamine or N,N-dicycloalkyl amine is subjected to oxyalkylenation by reaction with one mole of ethylene oxide, propylene oxide, butylene oxide or other desired alkylene oxide. This reaction is readily effected by charging the N,N-di-substituted-amine into a reaction zone and passing the alkylene oxide into contact with the amine. Preferably at least equal mole proportions of alkylene oxide and amine are employed, although an excess of one may be used to insure complete reaction. The reaction readily occurs at a low temperature which may range from room temperature to 150° C. in the absence of a catalyst.

It is an essential requirement of the present application that the alkanolamine is an N,N-di-substituted-alkanolamine and that these substituents are secondary alkyl or equivalent. It will be noted that the cyclohexyl substituent corresponds to a sec-alkyl substituent in that the carbon atom attached to the nitrogen is itself attached to two other carbon atoms. In another embodiment the particularly substituted alkanolamine may contain one sec-alkyl group and one cycloalkyl group as, for example, in compounds as N-isopropyl-N-cyclohexyl-ethanolamine, N-sec-butyl-N-cyclohexyl-ethanolamine, N-sec-pentyl-N-cyclohexyl-ethanolamine, N-sec-heptyl-N-cyclohexyl-ethanolamine, N-sec-octyl - N - cyclohexyl-ethanolamine, etc., and corresponding compounds in which the ethanolamine moiety is replaced by an alkanolamine moiety of from 3 to about 8 carbon atoms.

The borate of the present invention is prepared in any suitable manner. Any suitable borylating agent may be used. A particularly preferred borylating agent is boric acid. Other borylating agents include trialkyl borates in which the alkyl groups preferably contain from 1 to 4 carbon atoms each. In the use of the latter type borylating agent, the reaction is effected by transesterification and, accordingly, there is no advantage to using trialkyl borates containing more than 4 carbon atoms in each alkyl group, although the higher boiling trialkyl borates may be used when satisfactory and advantages appear therefor. Still other borylating agents include alkyl boric acid, dialkyl boric acid, boric oxide, boric acid complex, cycloalkyl boric acid, dicycloalkyl boric acid, aryl boric acid, diaryl boric acid or substitution products of these with alkoxy, alkyl and/or halo groups, etc.

The reaction of the borylating agent and alkanolamine is effected in any suitable manner. The ortho-borates are formed by heating and stirring the reactants at a temperature up to about 100° C. and thus within the range of from about 60 to about 100° C. when using boric acid. The meta-borates are formed at temperatures above 100° C. and thus may be within the range of from about 100° to about 200° C. or more. The higher temperature of from about 100° to about 200° C. is used when employing trialkyl borates in order to effect the transesterification reaction. In one method the reactants are refluxed in the presence of a solvent. Any suitable solvent may be used and advantageously comprises an aromatic hydrocarbon solvent including benzene, toluene, xylene, ethylbenzene, cumene, etc., or mixtures thereof. Also, n-hexane, n-heptane, n-octane, n-decane, n-dodecane and chlorinated hydrocarbons may be used. In fact, any water azeotropic solvent which is non-reactive with boric acid or alkanolamine may be used. The use of a solvent is particularly preferred when boric acid is used as the borylating agent. When using a trialkyl borate as the borylating agent, the solvent may be omitted. While no catalyst normally is required, a catalyst may be used when employing the trialkyl borate. Any suitable catalyst may be employed including sodium hydrogen sulfate, potassium hydrogen sulfate, tin oxide, polyalkyl tin derivatives, alkoxy tin derivatives, polyalkyl titanium derivatives, alkoxy titanium derivatives, trialkyl or trialkoxy aluminum, etc. The borylating agent and alkanolamine generally are used in a mole proportion within the range of from about 0.3 to 1 and more particularly from about 0.5 to 1 mole proportion of borylating agent per one mole proportion of alkanolamine.

In another embodiment, an alcohol, including aliphatic or aromatic alcohol, or mercaptan, including aliphatic or aromatic mercaptan, is included in the reaction charge to satisfy one or two of the valences of the boron. When used, the alcohol or mercaptan generally is employed in an amount of from about 0.5 to about 2 mole proportions thereof per one mole proportion of the alkanolamine. Preferred aliphatic alcohols include methanol, isopropanol, ethanol, butanol, pentanol, hexanol, heptanol, octanol, nonanol, decanol, undecanol, dodecanol, tridecanol, tetradecanol, pentadecanol, hexadecanol, heptadecanol, octadecanol, nonadecanol, eicosanol, etc. Preferred aromatic alcohols include phenol, cresol, xylenol, etc., or these having alkoxy or halo substituents. Preferred mercaptans include butyl mercaptan, pentyl mercaptan, hexyl mercaptan, heptyl mercaptan, octyl mercaptan, nonyl mercaptan, decyl mercaptan, undecyl mercaptan, dodecyl mercaptan, etc., and thiophenol, thiocresol, thioxylenol, etc.

As hereinbefore set forth, the reaction is readily effected by heating and refluxing the borylating agent and alkanolamine, with or without solvent and/or catalyst as required. Refluxing is continued until the required amount of water when using boric acid or alcohol when using trialkyl borate is collected. Following completion of the reaction, the solvent and alcohol, if any, are removed by vacuum distillation. The borated alkanolamine is recovered as a liquid and used as such or, when desired, the product may be retained in the solvent and used as such or the product may be prepared as a solution in a different solvent and used in this manner.

The exact structure of the borated product will vary with the proportions of reactants employed, with the particular borylating agent and whether an extraneous alcohol or mercaptan is used. For example, when reacting 3 mole proportions of N,N-di-cyclohexyl-ethanolamine with 1 mole proportion of boric acid, it is believed that the triester is formed in which all valences of the boron are satisfied by the N,N-di-cyclohexyl-aminoethoxy radical formed by the liberation of water. When equal mole proportions of N,N-di-cyclohexyl-ethanolamine and boric acid are reacted at a higher temperature, the meta-borate is formed. When the reaction is effected using an extraneous alcohol or mercaptan in addition to the alkanolamine, the resulting borate will be a mixed borate in which one or two of the valences of the boron are satisfied by the alkanolamine and the remaining valence or valences of the boron are satisfied by the alcohol or mercaptan. When employing a trialkyl borate as the borylating agent, either complete or partial transesterification occurs depending upon the proportions of reactants and conditions of operation.

From the above discussion, it will be seen that the exact structure of the borate may vary and also that the product may consist of a mixture of compounds. Accordingly, the additives of the present invention are being claimed generically and by their method of manufacture. It is understood that the different borated compounds meeting the requirements as hereinbefore set forth may be used for the purposes of the present invention but that the different additives are not necessarily equivalent in their effectiveness in the same or different substrates.

As hereinbefore set forth, the additives of the present invention are used for improving the weathering properties of solid organic substrates. Although the mechanism in which these compounds function is not completely understood, these compounds serve to protect substrates which undergo ultraviolet light induced oxidation. In addition, these compounds possess anti-static properties and adhesion improving properties. In addition, the compounds are effective as antioxidants and peroxide decomposers and bactericides, especially for petroleum products. Also, they may serve as dye sites in plastics.

Furthermore, they are of ready solubility in most substrates. The substrates normally subject to exposure to weather include plastics. In addition, the additives of the present invention may be used in paints, varnishes and other coatings.

Illustrative plastics which are stabilized by the novel compounds of the present invention include polymers of monolefins such as polyethylene, polypropylene, polybutylene, mixed ethylene propylene polymers, mixed ethylene butylene polymers, mixed propylene butylene polymers, mixed styrene ethylene polymers, mixed styrene propylene polymers, etc. The solid olefin polymers are used in many applications including electrical insulation, light weight outdoor furniture, awnings, cover for greenhouses, etc. In many of these applications the solid olefin polymer is exposed to sunlight and air.

Another plastic being used commercially on a large scale is polystyrene. The polystyrenes are particularly useful in the manufacture of molded or machined articles which find application in such goods as windows, optical goods, automobile panels, molded household articles, etc. One disadvantage of polystyrene is its tendency to deteriorate when exposed to direct sunlight and air for extended periods of time.

Another class of plastics available commercially is broadly classed as vinyl resins and is derived from monomers such as vinyl chloride, vinyl acetate, vinylidine chloride, etc. Polyvinyl chloride plastics are available commercially on a large scale and undergo deterioration when exposed to sunlight. Other vinyl type resins include copolymers of vinyl chloride with acrylonitrile, methacrylonitrile, vinylidine chloride, alkyl acrylates, alkyl methacrylates, alkyl maleates, alkyl fumarates, polyvinyl butyral, etc., or mixtures thereof.

Other plastics being used commercially on a large scale are in the textile class and include Nylon (polyamide), Perlon L or 6-Nylon (polyamide), Dacron (terephthalic acid and ethylene glycol), Orlon (polyacrylonitrile), Dynel (copolymer of acrylonitrile and vinyl chloride), Acrilan (polyacrylonitrile modified with vinyl acetate), Saran (copolymer of vinylidine chloride and vinyl chloride), Rayon, etc. Here again, deterioration occurs due to ultraviolet light and oxidation.

Still other plastics are prepared from other monomers and are available commercially. Illustrative examples of such other solid polymers include polycarbonates, phenol-formaldehyde resins, urea-formaldehyde resins, melamine-formaldehyde resins, acryloid plastics which are derived from methyl, ethyl and higher alkyl acrylates and methacrylates as monomers used in the polymerization. Other polymers include polyacetals, especially polyformaldehydes such as "Delrin" and "Celcon." Still other substrates include vinyl, acrylic, nitrocellulose based coatings; especially cellulose acetate, cellulose acetate butyrate, ethyl cellulose, etc. Still other substrates are polyesters, including linear or cross-linked, reinforced polyesters, laminate polyesters, etc., various latexes, lacquers, alkyds, varnishes, polishes, stains, pigments, dyes, textile finishing formulations, etc.

It is understood that the plastic may be fabricated into any desired finished product including moldings, castings, fibers, films, sheets, rods, tubing or other shapes.

Rubber is composed of polymers of conjugated 1,3-dienes, either as polymers thereof or as copolymers thereof with other polymerizable compounds, and the rubbers, both natural and synthetic, are included as solid polymers in the present specifications and claims. Synthetic rubbers include SBR rubber (copolymer of butadiene and styrene), Buna A (copolymer of butadiene and acrylonitrile), butyl rubber (copolymer of butadiene and isobutylene), neoprene rubber (chloroprene polymer), Thiokol rubber (polysulfide), silicone rubber, etc. The natural rubbers include hevea rubber, caoutchouc, balata, gutta-percha, etc. It is well known that rubber undergoes deterioration due to oxygen and, when exposed to direct sunlight for extended periods of time, also undergoes deterioration from this source.

The above are illustrative examples of various plastics and solid polymers which are improved by the additives of the present invention. As hereinbefore set forth, still other substrates include paints, varnishes, drying oils, pigments, rust preventive coatings, wax coatings, protective coatings, etc. It is understood that the compounds of the present invention may be used in any coating which is subject to exposure to ultraviolet light, oxidation, heat, etc. While the compounds are especially useful in materials subject to such exposure, it is understood that the compounds of the present invention also may be used advantageously in other coatings, plastics, paints, etc., which normally are not exposed outdoors.

In many applications it is advantageous to utilize the compounds of the present invention in conjunction with other additives. For example, particularly improved results are obtained in the stabilization of plastics, apparently due to a synergistic effect, when the compound of the present invention is used in admixture with a phenolic antoxidant including particularly 2,6-ditertiarybutyl-4-methylphenol. Other inhibitors which may be used generally will be of the phenolic or amine type and include phenylalpha-naphthylamine. phenyl-beta-naphthylamine, phenothiazine, Nonox WSP, Nonox Cl, dialkylated phenols, trialkylated phenols including 2,4-dimethyl-6-tertiary-butylphenol, etc., Santonox R, Santo-white, alkyl-alkoxy-phenols, 2246 (2,2'-methylene-bis-4-methyl-6-tert-butyl-phenol) and 425 (2,2'-methylene-bis-4-ethyl-6-tert-butyl-phenol) (American Cyanamid), diphenyl-p-phenylenediamine, 1,1,3 - tris-(2-methyl-4-hydroxy-5-t-butyl-phenyl)-butane, 703 (2,6 - di - tert-butyl-alpha-dimethylamino-p-cresol) (Ethyl Corporation), 4,4'-bis-(2-methyl-6-tert-butylphenol), 4,4'-thiobis-(6-tert-butyl-o-cresol), 4,4' - bis-(2,6-di-tert-butylphenol), 4,4'-methylene-bis-(2,6-di-tert-butylphenol), Salo (salicyclic acid esters), p-octyl-phenyl-salicylate, various phosgene alkylated phenol reaction products, various alkoxyalkyldihydroxybenzophenones, polyalkyldihydroxybenzophenones, t e t r ahydroxybenzo-phenones, 2,4,5-trihydroxybutyrophenone and especially such hydroxybenzophenones as 2,2'-dihydroxy-4-octoxy-benzophenone, 2,2' - dihydroxy - 4-decoxybenzophenone, 2,2'-dihydroxy-4-dodecoxybenzophenone, 2,2'-dihydroxy-4-octadecoxybenzophenone, etc., in general any alkoxy or cycloalkoxy substituted 2,2'-dihydroxybenzophenone, 2-hydroxy-4'-octoxybenzophenone, 2-hydroxy-4'-decoxybenzophenone, 2-hydroxy-4'-dodecoxy, etc., and in general any alkoxy or cycloalkoxy substituted 2-hydroxybenzophenone. Other ultraviolet light stabilizers include nickel-bis-dithiocarbamates, nickel-bis-dihydroxypolyalkylphenol sulfides, especially [2,2'-thiobis-(4-t-octylphenolato)]-n-butylamine nickel (II), dilauryl beta-mercaptodipropionate, dihydroxytetralkyl sulfides, dihydroxytetralkyl methanes, various trithiophosphites as trilaurylthiophosphite, dialkylphosphites, trialkylphosphites, high molecular weight nitriles, various Mannich bases, various N-hydroxyphenylbenzotriazoles such as 2-(2'-hydroxy-5'-octyl-phenyl)-benzotriazole, 2-(2-hydroxy-5'-dodecylphenyl)-benzotriazole, 2 - (2'-hydroxy-5'-octoxyphenyl)-benzotri-azole, 2 - (2'-hydroxy-5'-dodecoxyphenyl)-benzotriazole, Tinuvin 326, etc., in general, any alkyl or alkoxyphenyl substituted benzotriazole, etc. The additional inhibitor may be used in a concentration of from about 1% to about 75% by weight of the compound of the present invention. Generally, the additional inhibitor will be used in a concentration within the range of from about 0.001% to about 3% and more particularly from about 0.01% to about 2% by weight of the substrate.

The additive of the present invention will be used in a stabilizing concentration which will depend upon the particular substrate. The additive may be used in a concentration as low as 0.0001% to as high as 25% but generally will be used in a concentration of from about 0.01% to about 5% by weight of the substrate. The additive is incorporated in the substrate in any suitable manner. Incorporation into a solid plastic is readily obtained by adding the additive to the hot melt with stirring, generally in a Banbury mixer, extruder or other device. When added to paint, the additive is incorporated into the paint with intimate stirring.

The additive of the present invention may be utilized as such or prepared as a solution in a suitable solvent including alcohols and particularly methanol, ethanol, propanol, butanol, etc., hydrocarbons and particularly benzene, toluene, xylene, cumene, decalin, etc.

The following examples are introduced to illustrate further the novelty and utility of the present invention but not with the intention of unduly limiting the same.

Example I

The additive of this example was prepared by the reaction of 3 mole proportions of N,N-di-cyclohexyl-ethanolamine with 1 mole proportion of boric acid. Specifically, 68.4 g. (0.3 mole) of N,N-di-cyclohexyl-ethanolamine and 6.18 g. (0.1 mole) of boric acid were refluxed in the presence of 100 g. of benzene at a temperature of about 85° C. The heating and refluxing was continued until a total of 5 cc. of water was collected. Following completion of the reaction, the benzene was removed by vacuum distillation at a temperature of about 170° C. at 0.4 mm. Hg. The product was recovered as a liquid having a basic nitrogen content of 4.29 meq./g., an acid value of 0.008 meq./g. and a boron content of 1.42% by weight. This corresponds to the theoretical boron content of 1.58% by weight for the compound tris-(N,N-di-cyclohexyl-aminoethoxy) borate having the formula:

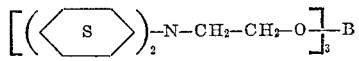

Example II

The additive mixture of this example is believed to include the same compound as prepared in Example I. This preparation was made by refluxing 67.5 g. (0.3 mole) of N,N - di - cyclohexyl - ethanolamine and 26 g. (0.1 mole+10%) of tri-n-butyl borate at a temperature ranging from 150° to 203° C. The refluxing was continued until a total of 20 g. of butanol was collected, the butanol being formed by the transesterification reaction. The reaction product was distilled at a temperature of about 159° C. under a vacuum of 18 mm. Hg. The product was recovered as a liquid having a boron content of 1.72% by weight. It will be noted that a 10% excess of tri-n-butyl borate was employed in this run and, on the basis that the excess underwent chelation during the reaction, the theoretical percent boron of the mixed reaction product is calculated to be 1.69% by weight.

Example III

The additive of this example is the meta-borate formed by the reaction of N,N-di-cyclohexyl-ethanolamine and boric acid. This reaction was effected by heating and refluxing 33.75 g. (0.15 mole) of N,N-di-cyclohexyl-ethanolamine and 9.28 g. (0.15 mole) of boric acid in the presence of 100 g. of benzene. The temperature of reaction was above 90° C. and a total of 4.9 cc. of water was collected. The product was a solid having a boron content of 4.05% by weight which corresponds to the theoretical boron content of 4.15% by weight for the meta-borate formed by the reaction of equal mole proportions of N,N-di-cyclohexyl-ethanolamine and boric acid.

Example IV

The additive of this example was prepared by the reaction of N,N-di-cyclohexyl-ethanolamine and nonyl boric acid. Specifically, 22.5 g. (0.1 mole) of N,N-di-cyclohexyl-ethanolamine and 8.59 g. (0.05 mole) of nonyl boric acid were heated and refluxed in the presence of 50 g. of benzene. A total of 1.4 cc. of water was collected. The product was vacuum distilled at a temperature of 115° C. and 18 mm. Hg. The product is believed to be the N,N-di-cyclohexyl-aminoethoxy diester of nonyl boric acid. 1.71% by weight of boron was found on analysis.

Example V

The additive of this example was prepared by the reaction of N,N-di-sec-octyl-ethanolamine and boric acid. It was prepared by heating and refluxing 33.7 g. (0.118 mole) of N,N-di-(1-methylheptyl)-ethanolamine and 2.43 g. (0.039 mole) of boric acid in 100 g. of benzene at a temperature of about 85° C. Following completion of the reaction and removal of the benzene by vacuum distillation at 145° C. and 18 mm. Hg, the product was recovered as a liquid having a boron content of 1.30% by weight. This corresponds to a theoretical boron content of 1.25% by weight for the triester of the reaction of 3 mole proportions of the N,N-di-sec-octyl-ethanolamine with 1 mole of boric acid and may be illustrated by the formula

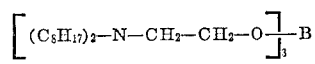

Example VI

The additive of this example is prepared by heating and refluxing 2 mole proportions of N,N-di-isopropyl-propanolamine, 1 mole proportion of isooctyl alcohol and 1 mole proportion of boric acid in the presence of 200 g. of benzene. The reaction is continued until the desired amount of water is collected, after which the liquid product is subjected to distillation under vacuum to remove the benzene solvent.

Example VII

The additive of this example is prepared by heating and refluxing a mixture of 1 mole proportion of boric acid, 2 mole proportions of N,N-di-cyclohexyl-propanolamine and 1 mole proportion of 2,6-ditertiarybutyl-4-methylphenol in the presence of benzene solvent. The heating and refluxing is continued until the desired amount of water is collected, after which the reaction mixture is subjected to distillation under vacuum to remove the benzene solvent and to recover the liquid product.

Example VIII

The additive of this example is prepared by heating and refluxing a mixture of 1 mole proportion of boric acid, 2 mole proportions of N,N-di-sec-hexyl-ethanolamine and 1 mole proportion of butyl mercaptan in the presence of benzene solvent. The heating and refluxing is continued until the reaction is completed and the product then is subjected to vacuum distillation to remove the benzene solvent. The product is recovered as a liquid and may be used as such or formed as a solution in a suitable solvent.

Example IX

The additive, prepared as described in Example I, is used as a weathering agent in plastics. The plastic of this example is solid polypropylene. The solid polypropylene without inhibitor is stated to have properties substantially as follows:

TABLE I

| | |
|---|---|
| Specific gravity | 0.910–0.920 |
| Refractive index $n_D^{25}$ | 1.510 |
| Heat Distortion Temperature: | |
| At 66 p.s.i. load, ° C. | 116 |
| At 264 p.s.i. load, ° C. | 66 |
| Tensile yield strength, p.s.i. (ASTM W-638-58T) (0.2″ per min.) | 4700 |
| Total elongation percent | 300–400 |
| Stiffness Flexural (ASTM D747-50) 105 p.s.i. | 1.8 |
| Shore hardness (ASTM D676-55T) | 74D |

The polypropylene was milled in a two-roll heated mill of conventional commercial design and the additive, when employed, was incorporated in the sample during the milling. The samples were pressed into sheets of about 17 mil. thickness and cut into plaques of about 1⅜" x 1½". The plaques were inserted into plastic holders, affixed onto a rotating drum and exposed to carbon arc rays at about 52° C. in a Weather-Ometer. The samples were examined periodically by infrared analysis to determine the carbonyl band at 1715 cm.$^{-1}$ which is reported as the "carbonyl number." The higher intensity of the carbonyl band indicates a higher carbonyl concentration (expressed as carbonyl number) and accordingly increased deterioration.

A sample of the polypropylene without inhibitor developed a carbonyl number of greater than 1000 within 120 hours of exposure in the Weather-Ometer. Another sample of the same polypropylene containing 0.15% by weight of 2,6-ditertiarybutyl-4-methylphenol developed a carbonyl number over 1000 within 360 hours of exposure in the Weather-Ometer.

Another sample of the solid polypropylene containing 1% by weight of the borated compound of Example I and 0.15% by weight of 2,6-ditertiarybutyl-4-methylphenol was evaluated in the Weather-Ometer in the same manner. After about 1600 hours of exposure in the Weather-Ometer, the carbonyl number had not changed from the original number of 165 and after 1900 hours the carbonyl number had increased to only about 250. As another important advantage of the additive of the present invention, the sample of polypropylene containing this additive, even after exposure in the Weather-Ometer for this long period of time, still remained clear and did not undergo discoloration.

Example X

The solid polypropylene plastic of Example I also was evaluated for physical properties after exposure in the Weather-Ometer. Dumb-bell specimens (1" wide, 4⅜" long and 0.020" thick with the neck being 1" long and ¼" wide) were exposed in the Weather-Ometer in the same manner described in Example IX and then the physical properties were evaluated in an Instrom Univeral tester. In general, the Instrom Universal tester is a machine in which the dumb-bell specimen is gripped firmly at the top and bottom. A constant pull of two inches per minute is exerted downwardly and the following data are obtained: (1) the percent elongation until rupture occurs, (2) the tensile strength which is the pounds per square inch of force at which rupture occurs, (3) the pull strength which is the pounds per square inch of elongation between the yield point and the tensile strength and (4) the elastic modulus which also is reported in pounds per square inch. The data in the following table report the results of such evaluations for (1) a sample of the polypropylene without additive and (2) a sample of the polypropylene containing 1% by weight of the additive of Example I and 0.15% by weight of 2,6-ditertiarybutyl-4-methylphenol. In each case, these data were obtained prior to exposure in the Weather-Ometer and after 480 hours. The sample containing the additive also was evaluated after 720 hours of exposure in the Weather-Ometer.

containing the additive composition of Example IX still retained a considerable portion of these desired physical properties even after exposure in the Weather-Ometer for 720 hours.

Example XI

The additive prepared as described in Example V also was evaluated in another sample of the solid polypropylene and in the same manner as described in Example IX. This sample has now been exposed in the Weather-Ometer for 1080 hours and the carbonyl number is only 183. Here again, the sample of polypropylene, even after exposure in the Weather-Ometer for this long period of time, still remained clear and did not undergo discoloration.

Example XII

The plastic of this example is solid polyethylene of the high density type. An inhibited product of this polyethylene is marketed commercially under the trade name of Fortiflex by the Celanese Corporation of America. A special batch of this polyethylene free of inhibitor is obtained and is cut into plaques in the same manner described in Example IX and evaluated in the Weather-Ometer. A sample of this polyethylene without inhibitor, when evaluated in the Weather-Ometer, increases from a carbonyl number of 28 to a carbonyl number of 855 within 624 hours. In contrast, another sample of the polyethylene containing 1% by weight of the additive prepared as described in Example III does not develop a carbonyl number above 800 for a considerable longer period of time.

Example XIII

The additive of Example IV is incorporated in a concentration of 1% by weight in polystyrene and serves to inhibit deterioration of the polystyrene upon exposure to weathering.

Example XIV

The additive prepared as described in Example VI is utilized as a stabilizer in polyvinyl chloride plastic. The additive is incorporated by partly melting the polyvinyl chloride plastic and incorporating the additive in the hot melt in a concentration of 1% by weight. This serves to inhibit deterioration of the polyvinyl chloride plastic due to ultraviolet light.

I claim as my invention:

1. Solid polymer selected from the group consisting of polymonoolefins, vinyl resins and polystyrene, normally subject to deterioration by weathering containing, as a stabilizer against said weathering, a small but stabilizing concentration of a borate of N,N-di-hydrocarbyl-alkanolamine in which each hydrocarbyl group is selected from the group consisting of sec-alkyl containing from 3 to about 40 carbon atoms and cycloalkyl containing from 4 to about 12 carbon atoms, and the alkanolamine moiety contains from 2 to about 8 carbon atoms.

2. Solid polymer selected from the group consisting of polymonoolefins, vinyl resins and polystyrene, normally subject to deterioration by weathering containing, as a stabilizer against said weathering, a small but stabilizing concentration of the reaction product of a borylating agent, a N,N-di-sec-alkyl-alkanolamine in which the sec-

TABLE II

| Additive | Elongation, percent | | | Tensile Strength, p.s.i. | | | Pull Strength, p.s.i. | | | Elastic Modulus, p.s.i.×10⁴ | | |
|---|---|---|---|---|---|---|---|---|---|---|---|---|
| | 0 | 480 | 720 | 0 | 480 | 720 | 0 | 480 | 720 | 0 | 480 | 720 |
| None | 555 | | | 4,785 | | | 2,400 | | | 5.14 | | |
| Composition of Example IX | 503 | 402 | 377 | 4,455 | 3,050 | 2,975 | 2,500 | 2,555 | 2,590 | 5.4 | 5.20 | 5.43 |

From the data in the above table, it will be seen that the control sample (not containing an additive) lost all of its desirable physical properties after exposure in the Weather-Ometer for 480 hours. In contrast, the sample alkyl groups each contain from 3 to about 20 carbon atoms and the alkanolamine moiety contains from 2 to about 8 carbon atoms, and an alcohol selected from the group consisting of alkanol containing from 1 to about 20 carbon atoms and monocyclic aromatic alcohol, said reaction product being formed by the reaction, at a temperature of from about 60° to about 200° C., of one mole proportion of said alkanolamine with from about 0.3 to about 1 mole proportions of said borylating agent and from about 0.5 to about 2 mole proportions of said alcohol.

3. Solid polymer selected from the group consisting of polymonoolefins, vinyl resins and polystyrene, normally subject to deterioration by weathering containing, as a stabilizer against said weathering, a small but stabilizing concentration of the reaction product of a borylating agent, a N,N-di-sec-alkyl-alkanolamine in which the sec-alkyl groups each contain from 3 to about 20 carbon atoms and the alkanolamine moiety contains from 2 to about 8 carbon atoms, and a mercaptan selected from the group consisting of alkyl mercaptan containing from 4 to about 12 carbon atoms and monocyclic aryl mercaptan, said reaction product being formed by the reaction, at a temperature of from about 60° to about 200° C., of one mole proportion of said alkanolamine with from about 0.3 to about 1 mole proportions of said borylating agent and from about 0.5 to about 2 mole proportions of said mercaptan.

4. Solid polymer selected from the group consisting of polymonoolefins, vinyl resins and polystyrene, normally subject to deterioration by weathering containing, as a stabilizer against said weathering, a small but stabilizing concentration of a borate of an alkanolamine selected from the group consisting of N,N-di-sec-alkyl-alkanolamine in which the sec-alkyl groups each contain from 3 to about 20 carbon atoms and the alkanolamine moiety contains from 2 to about 8 carbon atoms and N,N-di-cyclohexyl-alkanolamine in which the alkanolamine moiety contains from 2 to about 8 carbon atoms.

5. Solid polymer selected from the group consisting of polymonoolefins, vinyl resins and polystyrene, normally subject to deterioration by weathering containing, as a stabilizer against said weathering, a small but stabilizing concentration of a borate of N,N-di-cycloalkyl-alkanolamine in which the cycloalkyl groups each contain from 4 to about 12 carbon atoms and the alkanolamine moiety contains from 2 to about 8 carbon atoms.

6. Solid polymer selected from the group consisting of polymonoolefins, vinyl resins and polystyrene, normally subject to deterioration by weathering containing, as an inhibitor against said deterioration, a small but stabilizing concentration of a borate of N,N-di-sec-alkyl-alkanolamine in which the sec-alkyl groups each contain from 3 to about 20 carbon atoms and the alkanolamine moiety contains from 2 to about 8 carbon atoms.

7. Solid polymer selected from the group consisting of polymonoolefins, vinyl resins and polystyrene, normally subject to deterioration by weathering containing, as an inhibitor against said deterioration, a small but stabilizing concentration of a borate of N,N-di-sec-alkyl-ethanolamine in which the sec-alkyl groups each contain from 3 to about 20 carbon atoms.

8. The composition of claim 7 also containing a stabilizing amount of a phenolic antioxidant.

9. Solid polymer selected from the group consisting of polymonoolefins, vinyl resins and polystyrene, normally subject to deterioration by weathering containing, as a stabilizer against said weathering, a small but stabilizing concentration of a borate of N,N-di-sec-octyl-ethanolamine.

10. The composition of claim 9 also containing a stabilizing amount of 2,6-ditertiarybutyl-4-methylphenol.

11. Solid polymer selected from the group consisting of polymonoolefins, vinyl resins and polystyrene, normally subject to deterioration by weathering containing, as a stabilizer against said weathering, asmall but stabilizing concentration of a borate of N,N-di-cyclohexyl-ethanolamine.

12. The composition of claim 11 also containing a stabilizing amount of 2,6-ditertiarybutyl-4-methylphenol.

References Cited

UNITED STATES PATENTS

| | | | |
|---|---|---|---|
| 3,227,739 | 1/1966 | Versteed | 260—584 |
| 2,872,479 | 2/1959 | Letsinger | 260—584 |
| 2,769,840 | 11/1956 | Sowa | 260—584 |
| 3,011,992 | 12/1961 | Anderson | 260—45.9 |

DONALD E. CZAJA, *Primary Examiner.*

H. E. TAYLOR, *Assistant Examiner.*